Aug. 7, 1951 M. DEN HERTOG 2,563,589

PULSE CONTROLLED RECTIFIER NETWORK

Filed June 12, 1950 3 Sheets-Sheet 1

Inventor
MARTINUS DEN HERTOG

By Robert Harding
Attorney

Aug. 7, 1951 M. DEN HERTOG 2,563,589

PULSE CONTROLLED RECTIFIER NETWORK

Filed June 12, 1950 3 Sheets-Sheet 2

Inventor
MARTINUS DEN HERTOG

By Robert Harding Jr.
Attorney

Aug. 7, 1951 M. DEN HERTOG 2,563,589

PULSE CONTROLLED RECTIFIER NETWORK

Filed June 12, 1950 3 Sheets-Sheet 3

Inventor
MARTINUS DEN HERTOG

By Robert Harding Jr.
Attorney

Patented Aug. 7, 1951

2,563,589

UNITED STATES PATENT OFFICE 2,563,589

PULSE CONTROLLED RECTIFIER NETWORK

Martinus den Hertog, Antwerp, Belgium, assignor to International Standard Electric Corporation, New York, N. Y., a corporation of Delaware Application June 12, 1950, Serial No. 167,673
In France June 2, 1949

14 Claims. (Cl. 177—353)

The present invention relates to a system of scanning electrical lines or equipments making it possible by static means to carry out a cyclic scanning of the electrical condition of circuits divided up into one or more groups in order to cause certain operation of selection, signalling or control, as also a system of comparison making it possible to employ the result of the scanning to effect said selection signallings or controls.

One feature of the invention comprises a system for selectively passing an electric signal from one of a number of individual electrical channels to a common electrical channel, said individual channels being multipled via a common point, said common channel being connected to different sources of potential, the potentials of which are capable of change from a normal absorbing value common to all sources to a blocking value common to all sources at different instants of time according to a predetermined cycle, whereby a signal potential applied to a channel is absorbed when the corresponding potential source has said absorbing value which is lower than said signal potential and transmits said signal potential to said common point when said potential source has said blocking value which is not substantially less than said signal potential.

Another feature of the invention comprises a system for selectively routing an electrical signal in any one of a predetermined plurality of different time positions characterised by a plurality of individual channels which are equal in number to said time positions and which are multipled in tree formation to a signal channel, different potential sources being connected to said individual channels, the potentials of which are capable of change from a normal absorbing value common to all said sources to a blocking value common to all said sources at different instants of time, one per individual channel, according to a predetermined cycle, whereby a signal potential applied to said signal channel is absorbed in each individual channel in which the corresponding potential source has said absorbing value which is lower than said signal potential and is effective on an individual channel only when the corresponding potential source has said blocking value.

Various other features will appear from the following description given as a non-limitative example, with reference to the attached drawings in which.

Figure 1:
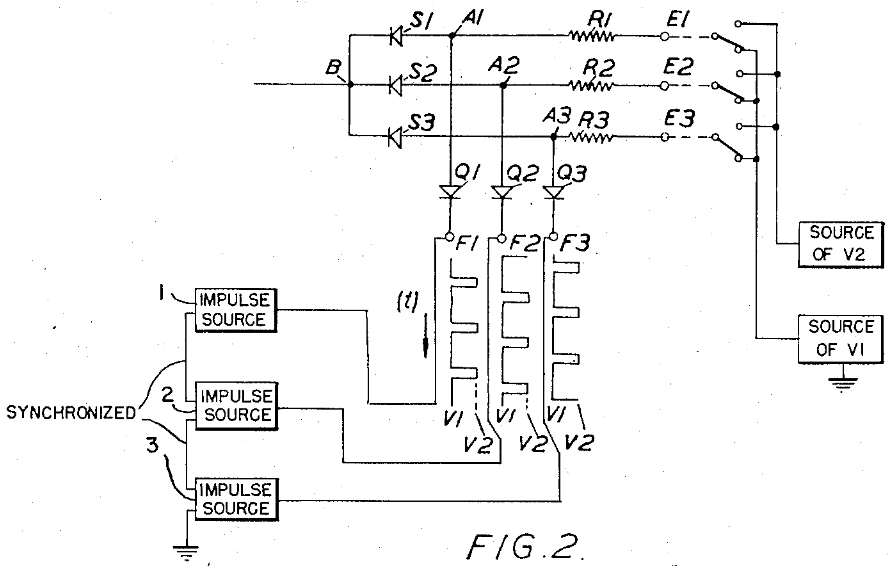
Fig. 1 shows a scanning device for a group of lines.

Fig. 1 shows an arrangement of circuit comprising three principal circuits E1B, E2B, E3B, in each of which are inserted a resistance R and a rectifier S. These circuits are connected in parallel to the point B, the object of rectifiers S1 to S3 being to prevent current from flowing between the terminals E when the potential of one of them is lower than that of one or both of the others. The terminals E1 to E3 are connected to the circuits to be scanned which can apply said terminals either to potential V1 or to potential V2, as indicated. There is connected to each of the scanning circuits a shunt circuit A1, F1; A2, F2; A3, F3, in which are inserted the rectifiers Q1, Q2, Q3. The terminals F1, F2 and F3 are respectively connected to three sources of impulses 1, 2, and 3 which cause their potential to vary from V1 to V2, at the same frequency, but in time units which have been assumed to be staggered by a third of a period in time, as indicated by the wave forms adjacent the connecting leads.

When the potential of the terminal E1 has the value V1 and that of terminal F1 the value V2, V2 being greater than V1, the rectifier Q1 is not conductive and the point A1 remains at the potential V1; when the potential of the terminal E1 has the value V2 and that of the terminal F1 the value V1, the rectifier Q1 is conductive and current flows from the generator connected to terminal E1 to the generator connected to terminal F1. This current flow causes a drop of potential in the resistance R1; by judicious choice of the value of this resistance, taking into consideration the value of the other elements of the circuits, it is possible to obtain that the potential of the point A1 is maintained at the value V1. When, at the same time the terminals E1 and F1 are applied to the potential V2, the point A1 is brought to this potential. In the same way, the points A2 and A3 will be brought to the potential V2 when said potential is simultaneously received on the terminals E2, F2 and E3, F3.

The point B will be brought to the potential V2 through rectifiers S1, S2, S3 whenever one of the points A1, A2 and A3 is brought to said potential V2.

It is clear that in accordance with a predetermined cycle, and in time units, the potential of the point B is that of a particular terminal among the terminals E1, E2 and E3. If the potential of the terminals E characterise the conditions of the lines which are scanned, the potential of the point B will successively represent the condition of said lines.

We thus get an actual successive and repeated scanning of the lines associated with the terminals E1, E2, E3.

By increasing the number of periodic impulse sources and consequently dephasing them with respect to each other in order only to have a single impulse at a given moment, it is possible to increase the number of lines scanned, each impulse source being allocated to a particular line.

The method which has just been described is limited, when the number of lines to be scanned increases, by the number of different sources of current which can be used in practice.

Figure 2:
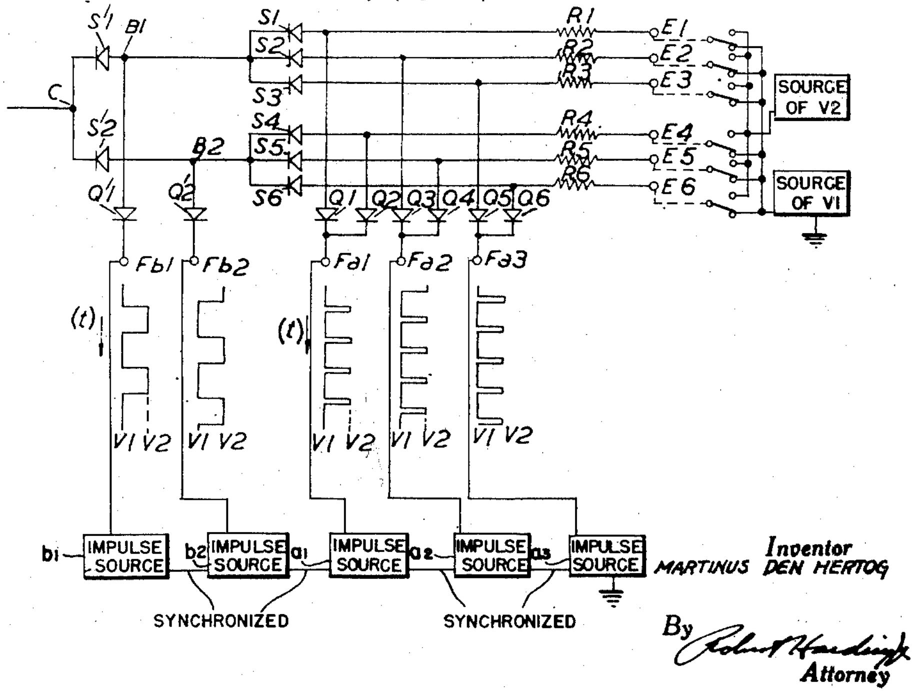
Fig. 2 shows a scanning device for an assembly of lines distributed into two groups.

The arrangement of Fig. 2 makes it possible to scan a large number of circuits with a number of sources of current which is lower than the number of circuits. It has been assumed, as an example, that the six scanning circuits were distributed into two primary groups identical with that of Fig. 1, of which the output circuits B1 and B2 are connected to a common point C, each of them through rectifiers S'1 and S'2, respectively. The points B1 and B2 are respectively connected to the terminals Fb1 and Fb2 through the rectifiers Q'1 and Q'2. The terminals Fb1 and Fb2 are connected respectively to impulse sources b1 and b2 peculiar to each of them; the duration of the impulses produced by each of these sources is equal to one cycle of successive impulses of short duration of each of the sources a1, a2, and a3 connected to terminals Fa1, Fa2, Fa3.

Moreover, the long impulses of the two sources b1 and b2 connected to Fb1 and Fb2 are successive in time, that is to say, that at a given moment, only one of the sources transmits an impulse. The duration of a cycle of two long successive impulses from b1 and b2 is equal to the duration of two successive cycles of short impulses from a1, a2 and a3. Each of the sources b1, b2 of slow impulses characterises one of the two primary groups.

If the sources of long impulses had not been connected to the points B1 and B2, a short impulse received on the terminal Fa1, for example, would as explained for Fig. 1, cause the simultaneous appearance at B1 and B2 of an impulse V2 if the two terminals E1 and E4 were at said potential V2. The points B1 and B2 being connected at Fb1 and Fb2, via the rectifiers Q'1 and Q'2, the simultaneous appearance of an impulse of voltage V2 at B1 and B2 cannot occur. In fact, if the terminals E1 and E4 are at potential V2 and an impulse V2 is received on the terminal Fa1, a long impulse can only be received on one of the terminals Fb1 or Fb2. It will be assumed that the long potential impulse b1 is received on the terminal Fb1. As the potential received from E1 at the point B1 also has the value V2, said point B1 will be brought to the potential V2 which will be transmitted to the point C via rectifier S'1. At the same moment the terminal Fb2 is at potential V1; owing to the fact that the potential V2 applied to the terminal E4 is returned to the point B2, said point B2 is at a higher potential than the terminal Fb2 and the rectifier Q'2 is conductive. Current will flow from the source connected to E4 into the source b2 connected to Fb2, causing in resistance R4, a drop of potential which lowers the potential of point B2 to the value V1. The indication of the electrical condition of terminal E4 will not then be sent to point C.

It is clear that it is thus possible successively to receive on the point C the indication of the electrical condition of the six terminals E. For example, by using 10 sources of short impulses staggered in time, the 10 sources of long impulses staggered in time of which the duration of each impulse would be equal to the duration of the cycle on a succession of short impulses, it would be possible to scan a 100 terminals E divided up into 10 primary groups of 10 terminals.

The rectifiers S'1 and S'2 are provided in order to prevent the lowest potential V1 received on one of the points B1 or B2 from influencing the highest potential V2 received simultaneously on the other of said points B1 or B2.

From the foregoing, it is clear that the scanning device causes the appearance, at its output point, successively of the electrical conditions of the lines which it is scanning. In an automatic telephone system for example, it is possible in this way to obtain the condition of each of the outlets which give its class, the group to which it belongs, whether it is free or busy, whether it is calling or not calling. These conditions are characterised by the presence of a particular potential in a particular time unit.

It is obvious that the number of scanning circuits per group and the number of groups can be increased by employing the impulses of short and of long duration which would be necessary.

These electrical conditions can then be compared with the electrical condition required in order to proceed with certain selection, signalling or control operations. In order to make this comparison and initiate the selection, signalling or control operations, it is possible, for example, to employ one of the means described in the patent applications filed to the present applicant on May 24, 1949, in France, for "Selection system for electrical circuits or equipments," No. 572,854 and No. 572,855.

Figure 3:
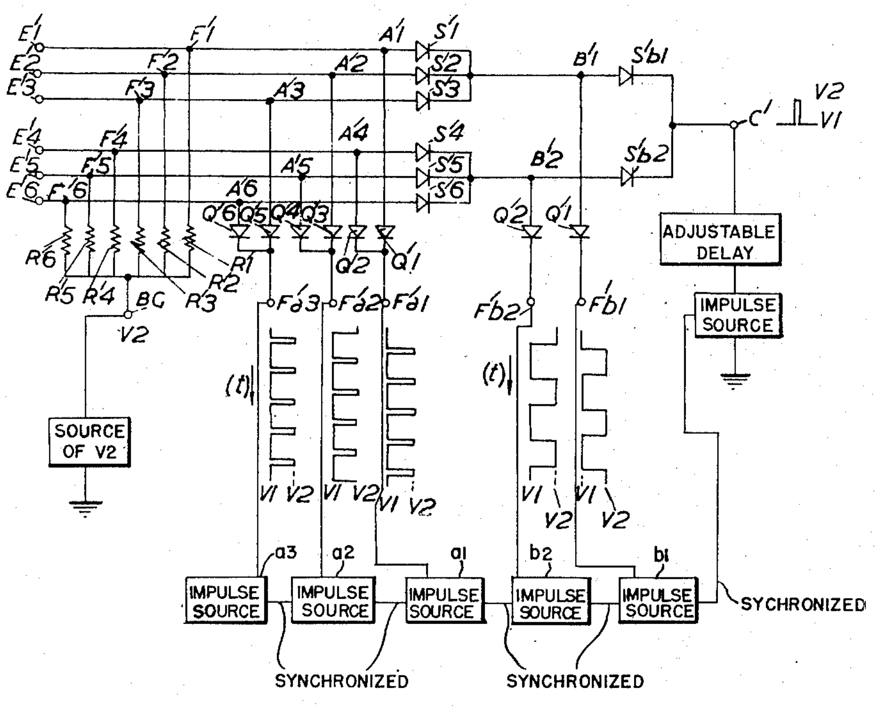
Fig. 3 shows a comparison device comprising two groups of control circuits.

It is also possible to use the device of Fig. 3 as comparator.

When no impulse is received on the input terminal C', the potential of said terminal has the value V1. Under these conditions the potential applied to the terminals E'1 to E'6 is maintained at the value V1. Let us, for example, consider the circuit connected to terminal E'1. If impulse V2 from the sources a1 and b1, respectively, are simultaneously received on terminal F'a1 and F'b1, the source V2 connected to terminal BG will discharge into the source connected to the point C' owing to the fact that the potential of the point F'1 being higher than that of the point C', the rectifiers S'1 and S'b1 are conductive. The drop of potential in resistance R'1 maintains the point F'1 and consequently the terminal E'1 at potential V1.

If an impulse V2 is received on the terminal C', the terminal E' of the circuit connected to the sources which give in the same time unit a potential V2 will be brought to said potential V2. The other terminals E' will remain at potential V1. Let us, for example, consider the circuit connected to terminal E'1. If, when impulse V2 is received on the terminal C', an impulse V2 is received at point A'1 from the source a1 connected to terminal F'a1, but no impulse is received at point B'1 coming from the terminal F'b1, the source of potential V2 connected to the terminal BG, will discharge in the source b1 connected to the terminal F'b1, said terminal being at the moment under consideration at the potential V1. Point F'1 will be kept at potential V1 on account of the drop of potential in resistance R'1. The potential V2 of terminal C' cannot be received on terminal E'1 owing to the orientation of rectifier S'b1. Similarly, if the potential V2 were received on the terminal F'b1, the terminal F'a1 being at potential V1, the point F'1 will be maintained at the potential V1 on account of the flow of current from terminal BG to terminal F'a1. If, on the other hand, a potential impulse V2 is simultaneously received on terminal F'a1, F'b1 and C' there can be no flow of current and the potential V2 of the source connected to terminal BG is applied to terminal E'1.

It is clear that it is thus possible to apply potential V2 to only one of the terminals E' at a given moment, said terminal depending on the position in time of the impulse V2 received on terminal C'. The potential V2 received on the terminals E' may be employed to produce any desired control or signalling by adjusting its time position.

It is obvious that the capacity of the comparator can be increased by increasing either the number of secondary comparison circuits of each of the groups or by increasing the number of groups and by employing the impulses of short and long duration which would be necessary.

Figure 4:
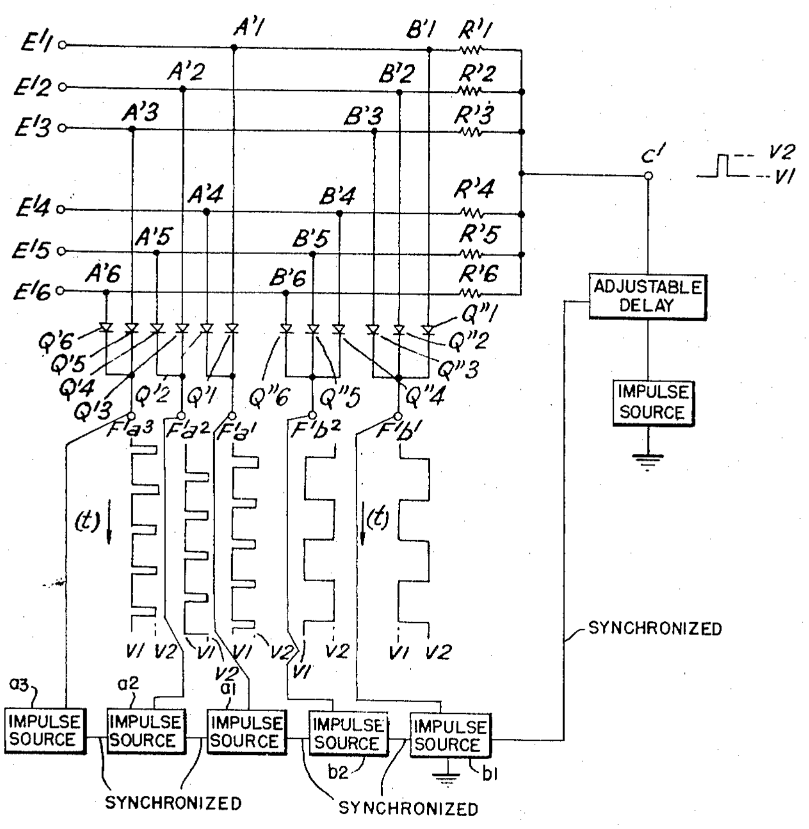
Fig. 4 shows a comparison device alternative to Fig. 3.

Referring now to Fig. 4, first of all, we will consider only the circuits $E'_1$, $E'_2$ and $E'_3$ and it will be assumed that the points $A'_1$, $A'_2$ and $A'_3$ have been respectively connected to the terminals F'a1, F'a2 and F'a3 but that the points $B'_1$, $B'_2$ and $B'_3$ have not been connected to the terminal $F'b_1$. When no control impulse is received on the input terminal C' of the comparator the said terminal is at a potential $V_1$ which is received on the terminals $E'_1$, $E'_2$, $E'_3$; said potential $V_1$ cannot cause an order. When an impulse of potential $V_2$ is received on one of the terminals $F'a_1$, $F'a_2$, $F'a_3$, from sources a1, a2, or a3, respectively, if at the same instant the point C' is at the potential $V_1$, the point $A'_1$, $A'_2$ or $A'_3$ is at a potential lower than that of the terminal F'a, and owing to their orientation, the rectifiers $Q'_1$, $Q'_3$, $Q'_5$ are not conductive and the point $A'_1$, $A'_2$, or $A'_3$ is maintained at the potential $V_1$. It would be assumed that an impulse of potential $V_2$ is received on the terminal C', the potential of the terminal F'a1 being at $V_1$. The potential of the point $A'_1$ being in this case higher than that of the terminal F'a1 the rectifier Q'1 is conductive, and current can flow from the source connected to the terminal C' into the source a1 connected to the terminal F'a1. This flow of current produces a drop of potential in the resistance $R'_1$ of which the value is chosen, taking into consideration the other elements of the circuit, so that the potential of the point $A'_1$, and consequently of $E'_1$, is maintained at the value $V_1$. If, on the other hand, an impulse $V_2$ is simultaneously received on the terminal C' and on the terminal $F'a_1$, there will be no flow of current through the rectifier $Q'_1$ owing to the fact that the point $A'_1$ and the terminal $F'a_1$ are at the same potential. The potential $V_2$ will in this case, be received on the terminal $E'_1$ and will cause the desired control or signalling.

Owing to the fact that the impulses of potential $V_2$ are received in different time units on the terminals $F'a_1$, $F'a_2$ and $F'a_3$, from sources a1, a2 and a3, respectively, the result is that upon reception of an impulse $V_2$ on the terminal C', only one of the terminals $E'_1$, $E'_2$ or $E'_3$ will be brought to the potential $V_2$; the said terminal will be that of the comparison circuit of which the impulses received on the shunt circuit has the same position in time as that received on the terminal C'.

It is obvious that without departing from the scope of the invention it would be possible to increase the number of comparison circuits by providing as many sources of potential impulses as of comparison circuits, the impulses of the different sources being situated in different time units.

We will now explain the operation of the whole of the devices of Fig. 4.

It has been assumed by way of example that the comparator device was made up of two groups of three comparison circuits. The circuits $E'_1$ and $E'_4$ are connected to the same terminal F'a1 through a rectifier $Q'_1$ and $Q'_2$ peculiar to each of them. Similarly the circuits $E'_2$ and $E'_5$ are connected to the terminal $F'a_2$ and the circuits $E'_3$ and $E'_6$ to the terminals $F'a_3$. Moreover the points $B'_1$, $B'_2$ and $B'_3$ of the three circuits of the first group are connected through the individual rectifiers $Q''_1$, $Q''_2$ and $Q''_3$ to the terminal $F'b_1$, and the points $B'_4$, $B'_5$ and $B'_6$ are connected through the individual rectifiers $Q''_4$, $Q''_5$ and $Q''_6$ to the terminal $F'b_2$. The said terminals $F'b_1$ and $F'b_2$ are connected respectively to two special impulse sources b1 and b2. The duration of the impulses from these sources is equal to the duration of one cycle situated in time of each of the impulses from the sources a1 to a3 connected respectively to terminal $F'a_1$, to $F'a_3$. For example, during the reception of a potential impulse on the terminal $F'b_1$, a potential impulse will be successively received in each of the terminals $F'a_1$, $F'a_2$, and $F'a_3$. Moreover the cycle of impulses from the sources b1 and b2 connected respectively to terminals $F'b_1$ and $F'b_2$ is provided so that at a particular moment only a single potential impulse is received from one or other of the sources.

From the above explanations it will be seen that in order that the control potential $V_2$ may be received on a terminal E', it is necessary for said potential to be simultaneously received on the terminals C', F'b and F'a. If, for example, at a particular moment potential $V_2$ is received on the terminals C', $F'b_1$ and F'a1, said potential will be transmitted to the terminal $E'_1$, the sources a1 and a2 connected to $F'a_1$ and $F'b_1$ not being open. On the other hand, the potential $V_2$ will not be received on the terminal $E'_4$. In fact, it being given that, at the moment under consideration, the terminal $F'b_1$ is at the potential $V_2$, the result is that the terminal $F'b_2$ is at potential $V_1$. The source b2 connected to $F'b_2$ absorbs the potential $V_2$ sent from $C'_1$ on the circuit of terminal $E'_4$ and causes in the resistance $R'_4$ a drop of potential which maintains the point $B'_4$ at the potential $V_1$.

It is clear that under these conditions, at a given moment, only one group of comparison circuits is in a condition to cause the control potential to appear on the output of one of these comparison circuits. It is therefore possible by this method to obtain a single order on an assembly, of circuits distributed in groups with a number of impulse sources lower than the total number of comparison circuits of the whole of the groups.

It is, of course, obvious that it would be possible without departing from the scope of the invention to increase capacity of the comparator either by increasing the number of comparison circuits in each of the groups, or by increasing the number of groups, or by combining the groups together and employing the impulse sources of diffferent durations and predetermined position in time which would be necessary.

I claim:

1. An electrical channel scanning system comprising a plurality of first electrical channels, a second electrical channel, circuits for connecting said first channels in multiple to said second channel, a common reference terminal, a plurality of sources of electrical pulse trains of equal repetition rate, the pulses of each train having a shorter time duration than the time displacement between pulses and the pulses of each train having a different time position with respect to the pulses of any other train, means including a plurality of rectifiers for connecting said sources of pulse trains respectively between said common reference terminal and points of said first electrical channels, there being one rectifier for each first channel and the rectifiers being so poled that the application of a pulse from an associated source will block current flow though the rectifier, means for selectively applying a signal potential having a value at least as great as the value of said pulses between said common reference terminal and one of said channels, a plurality of resistances associated respectively with said circuits in such a manner that any current flowing through a rectifier will pass through the associated resistance, and means for blocking current flow between said first channels.

2. A scanning system, according to claim 1, in which the means for applying a signal potential to a channel is means for applying constant signal potentials to one or more of the first channels.

3. A scanning system, according to claim 2, in which the resistances are included in the circuits between the means for connecting the pulse train sources and the means for applying the signal potentials.

4. A scanning system, according to claim 3, in which the means for blocking current flow between the first channels are rectifiers, one connected in each connecting circuit adjacent the second channel and poled so as to permit current to flow towards said second channel.

5. A scanning system, according to claim 1, in which the connecting circuits are divided into groups with the circuits of each group connected together and additional connecting circuits are provided connecting said groups to the second channel, and in which said system further comprises additional sources of pulse trains, one for each group of circuits, the pulses of each additional source having equal repetition rates, the said repetition rate being a sub-multiple of the repetition rate of the first-mentioned pulse trains, and each pulse having a time duration equal to a complete cycle of said first-mentioned pulse trains, with the pulses of each additional train having a different time position from that of the pulses of any other additional pulse train, and means for connecting each of said additional pulse train sources between the reference terminal and respective additional connecting circuits, said means including individual rectifiers for each circuit poled similarly to the first-mentioned rectifiers.

6. A scanning system, according to claim 5, in which the means for applying a signal potential to a channel is means for applying constant signal potentials to one or more of the first channels, and in which the resistances are included in the circuits between the means for connecting the pulse train sources and the means for applying the signal potentials.

7. A scanning system, according to claim 6, in which the means for blocking current flow between the first channels are rectifiers, one connected in each connecting circuit adjacent the second channel and poled so as to permit current to flow towards said second channel.

8. A scanning system, according to claim 1, further comprising means for applying a potential at least as great as the potential of the pulses between the common reference terminal and all of the first channels through the resistances associated with said channels, and in which means for applying the signal potential applies said potential to the second channel.

9. A scanning system, according to claim 8, in which the connecting circuits are divided into groups with the circuits of each group connected together and additional connecting circuits are provided connecting said groups to the second channel, and further comprising additional sources of pulse trains, one for each group of circuits, the pulses of each additional source having equal repetition rates, the repetition rate being a sub-multiple of the repetition rate of the first-mentioned pulse trains, and each pulse having a time duration equal to a complete cycle of said first-mentioned pulse trains, with the pulses of each additional train having a different time position from that of the pulses of any other additional pulse train, and means for connecting each of said additional pulse train sources between the reference terminal and respective additional connecting circuits, said means including individual rectifiers for each circuit poled similarly to the first-mentioned rectifiers.

10. A scanning system, according to claim 9, in which the means for applying a signal potential to a channel is a means for applying a pulse train to the second channel.

11. A scanning system, according to claim 10, in which the means for blocking current flow between the first channel are rectifiers, one connected in each connecting circuit adjacent the second channel and poled so as to permit current to flow towards said second channel.

12. A scanning system, according to claim 11, in which means for applying the constant potential to the first channels comprises individual connections to said channels including the resistances.

13. A scanning system, according to claim 1, in which the resistances are connected respectively in the connecting circuits adjacent the second channel and in which the means for applying a signal potential to a channel is means for applying a pulse train to the second channel.

14. A scanning system, according to claim 13, in which the connecting circuits are divided into groups with corresponding circuits of each group connected through individual rectifiers to a source of pulse trains which is different from the source of pulse trains connected to the other corresponding circuits of each group, and further comprising additional sources of pulse trains, there being one for each group of circuits, the pulses of each additional source having equal repetition rates, each repetition rate being a sub-multiple of the repetition rate of the first-mentioned pulse trains, and each pulse having a time duration equal to a complete cycle of said first-mentioned pulse trains, with the pulses of each additional train having a different time position from that of the pulses of any other additional pulse train, and means for connecting each of said additional pulse train sources between the reference terminal and all the circuits of a group, said means including individual rectifiers for each circuit poled similarly to the first-mentioned rectifiers, the means for blocking current flow between said first channels comprising the rectifiers over which said pulse trains are connected to said first channels.

MARTINUS DEN HERTOG.

REFERENCES CITED

The following references are of record in the file of this patent:

Proceedings of the I. R. E., February 1949, pages 139–147.